Nov. 3, 1970  A. D. ARSEM  3,538,322
POLARIZED LIGHT DISPLAY
Filed May 29, 1968
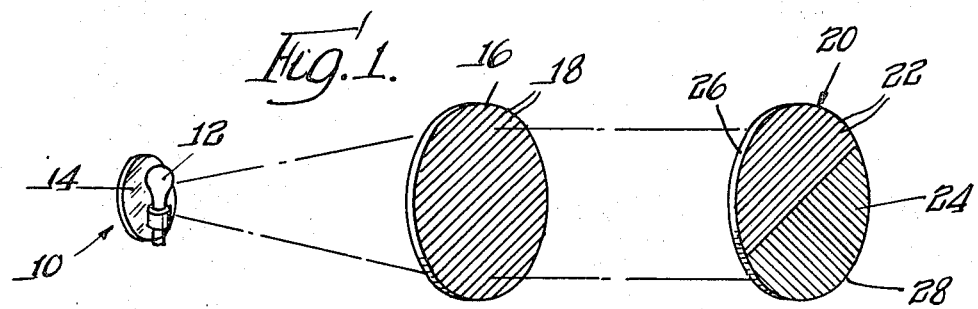
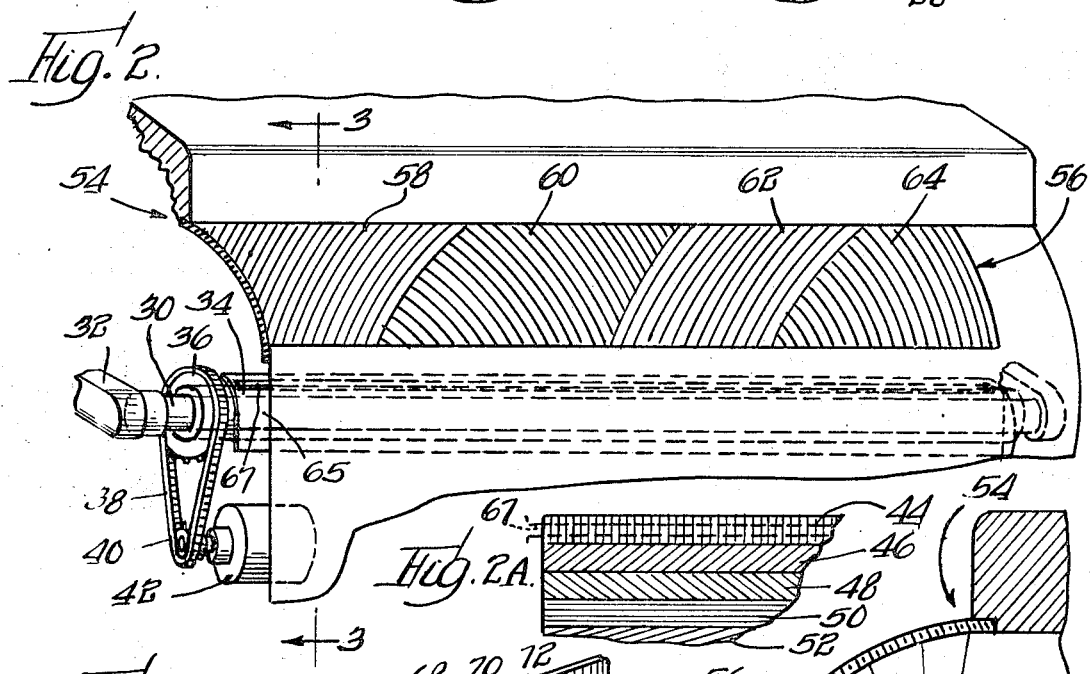
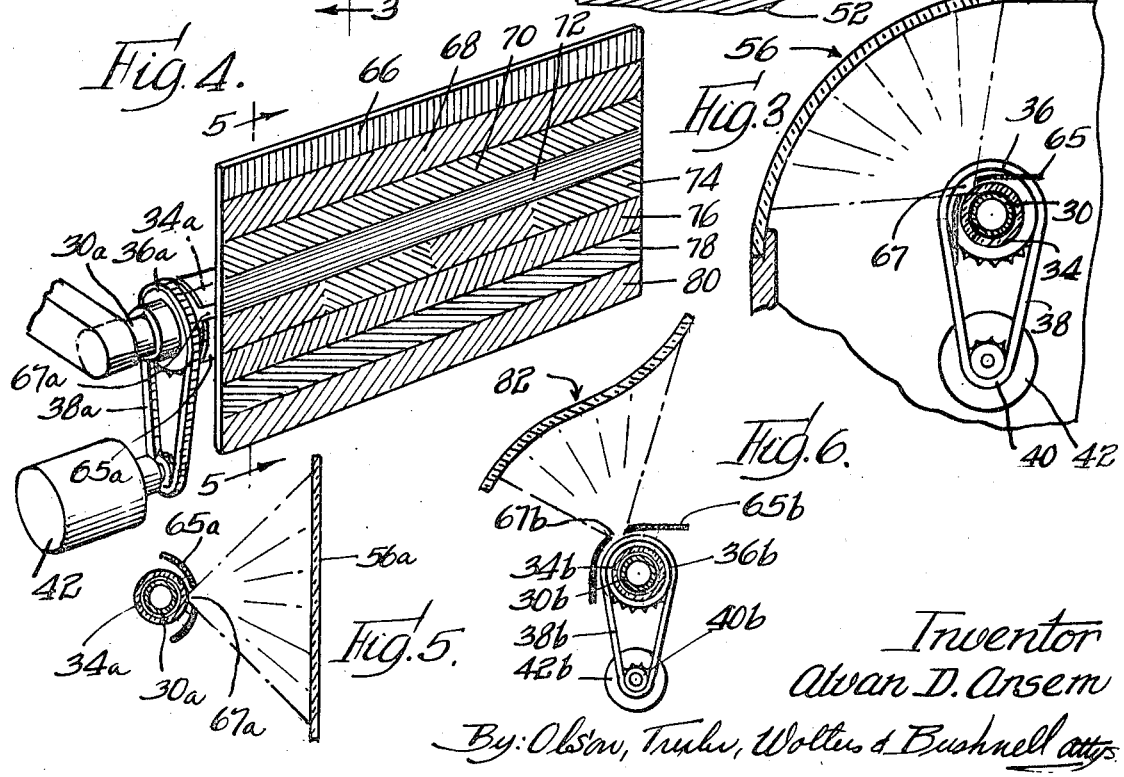
Inventor
Alvan D. Arsem
By: Olson, Trexler, Wolters & Bushnell attys United States Patent Office 3,538,322
Patented Nov. 3, 1970

3,538,322
POLARIZED LIGHT DISPLAY
Alvan Donald Arsem, Clarence, N.Y., assignor to The Wurlitzer Company, Chicago, Ill., a corporation of Delaware
Filed May 29, 1968, Ser. No. 733,138
Int. Cl. G02b 27/28
U.S. Cl. 240—9.5          4 Claims

ABSTRACT OF THE DISCLOSURE

A display panel is provided with a plurality of areas having different polarized patterns thereon. A rotating polarized light source with the plane of polarization rotating illuminates the display panel, either by reflected or by transmitted light. The visual appearance of the display panel changes as the polarization of the light impinged upon a display panel changes.

---

Various display items have heretofore been illuminated. Static or quiescent displays tend to be overlooked. However, moving displays, by virtue of their movement, tend to attract the attention of bystanders or passers-by, whereby the display can be much more effective. Unfortunately, movable displays tend to be rather complicated and expensive, and to require a certain amount of maintenance.

In accordance with the present invention, it is an object thereof to provide an optically movable display which is of a simple and inexpensive construction, and which requires little maintenance.

More particularly, it is an object of the present invention to provide apparent optical movement by projecting light of variable polarization on a display having areas of different polarization.

Specifically, it is an object of the present invention to provide a display having areas of variable polarization, and to illuminate such display by means of light passing through a rotating polarized member whereby to vary the polarization of the light falling on the display, and thereby to provide optical movement to the display.

Other and further objects and advantages of the present invention will be apparent from the following description when taken in connection with the accompanying drawings wherein:

FIG. 1 is a somewhat schematic drawing of a light source, rotating polarizing source, and polarized display item illustrating the principles of the invention;

FIG. 2 is a perspective view of one practical embodiment of the invention;

FIG. 2A is a fragmentary layout of the surface of the polarizing filter tube;

FIG. 3 is an enlarged sectional view taken substantially along the line 3—3 in FIG. 2;

FIG. 4 is a perspective view somewhat similar to FIG. 2 showing a flat display panel with different types of polarization thereon;

FIG. 5 is a vertical section taken substantially along the line 5—5 in FIG. 4; and FIG. 6 is a vertical section through a modification of the invention wherein light is reflected by the display panel, rather than transmitted as in the previous embodiments of the invention.

Turning now to the drawings in greater particularity, and first to FIG. 1, there will be seen a light source 10 illustrated as a light bulb 12 and a reflector 14. Light from the light source 10 falls on a transparent or translucent disc 16 mounted for rotation in any suitable manner, and polarized in one direction as indicated by the lines 18. Light passed by the disc 16 falls on a fixed disc 20 with the halves thereof polarized in different directions. For example, one-half of the disc is indicated as being polarized in the direction indicated by lines 22, while the other half is polarized at right angles thereto as indicated by the lines 24.

With the disc 16 in the position shown, the polarization is substantially parallel to that of the upper half 26 of the display disc 20, and at right angles to the polarization of the lower half 28. Thus, the upper half 26 of the disc is illuminated at full brilliance, while the lower half 28 is blacked out or substantially so. Upon rotation of the disc 16, as indicated by the arrow beneath it, the plane of polarization of the light transmitted by the disc 16 becomes progressively more oblique to the polarization of the other half 26 of disc 22, and progressively less oblique with respect to the disc half 28. Thus, the disc half 26 progressively darkens, while the disc half 28 progressively lightens, until the upper half 26 is substantially blacked out with the polarization at right angles to the lines 22, while the lower half is at maximum brilliance. As the disc 16 continues its rotation, the two halves 26 and 28 of the disc 20 alternate in lightness and darkness.

Turning now to FIGS. 2 and 3, a conventional fluorescent tube or light bulb 30 is shown as supported by any suitable fittings or fixtures 32. A cylindrical tube 34 of transparent or translucent material—preferably plastic—is mounted for rotation about the fluorescent tube 30. The rotary tube 34 may be mounted by any suitable bearings, or may simply be journaled on the fluorescent tube itself. The rotary tube 34 is provided at one end with a pulley 36, and this pulley is driven by a belt 38 from the output pulley 40 of an electric motor 42. The output pulley 40 may be driven through a speed reducer.

The tube 34 is provided with patterns of polarization as may be seen in enlarged fragmentary view of FIG. 2A. FIG. 2A represents a layout or surface projection of a part of the surface of the rotary tube 34, and it will be seen that the surface of the tube is divided into a succession of bands parallel to the axis thereof. Five such bands are shown in FIG. 2A, respectively numbered 44, 46, 48, 50 and 52. Different planes of palarization are indicated therein by the respective shading lines. Thus, the top band 44 is shown as polarized vertically (in the direction of rotation of the tube), while the band 46 is polarized at 45° to the right, and the band 44 is polarized horizontally (or perpendicular to the direction of rotation). The band 50 is polarized at 50° to the left, and the band 52 is polarized at a greater angle to the left.

The fluorescent tube 30, translucent or transparent tube 34, and associated parts are all mounted within a housing or casing 54 such as that of an automatic coin-operated phonograph, commonly known as a juke box. An elongated, arcuate panel 56 is provided in front of and above the tubes 30 and 34, and this panel is either transparent or translucent, and is provided with a plurality of areas or patterns polarized in different directions, as indicated at 58, 60, 62 and 64.

An arcuate shield 65 is interposed between the polarizing or filter tube 34 and the screen or display panel, and is provided with a long, narrow slit 67 parallel to the tube axis and through which the polarized light is transmitted. The shield 65 is very close to the tube 34, and the slot is narrow relative to a polarization band (see FIG. 2A) so that, essentially, only one band at a time is transmitted. Obviously the shield could be positioned between the light source and filter to attain the same results.

As the polarizing tube 34 rotates about he fluorescent tube 30, the angle of polarization of the light striking the display panel 56 will vary from band to band—i.e., 44, 46, etc.—whereby the various polarized areas 58, 60, 62, and 64 will be differently illuminated from time to time, thereby producing an illusion of movement.

A further modification of the invention is shown in FIGS. 4 and 5, and is generally similar to that in FIGS. 2, 2A and 3. The essential difference is that the display panel 56a is flat rather than arcuate, while the polarization thereon is somewhat different. The light source including the turning polarizing tube is similar to that previously described, and similar numerals are used with the addition of the suffix a to avoid duplication of description. In FIG. 2, the polarization on the display panel 56 is in areas of somewhat parallelogram or trapezoidal form. In FIG. 6 the polarization is in horizontal bands, 66, 68, 70, 72, 74, 76, 78, and 80, with variable angles of polarization, such as shown. The rotating polarizing tube 34a again is polarized in bands as previously discussed in connection with FIG. 2A. As will be apparent, there will be an ever-changing optical effect as the angle of polarization of the lights passing through the bands 44, 46, etc. strikes the polarized bands, 66, 68, etc. of the display panel 56a.

In each embodiment of the invention heretofore shown and described, the polarized panel has been illuminated by light transmitted through it. The present invention contemplates also the use of reflected light from a polarized panel, and this is shown in FIG. 6. The light source, including the fluorescent tube and rotary polarizing tube, remain the same as before, and similar numerals are used with the addition of the suffix b to avoid duplication of description. The display panel 82 is reflective, rather than being translucent or transparent, and the light source 30b thus is on the same side as that from which the panel is to be viewed. To provide proper angles of reflection, the panel 82 is in large measure concave on about a 45° angle down, but the upper portion thereof is convex, whereby the entire panel forms a very shallow or lazy inverted S. Reflective areas of polarization are applied on the face of the the panel 82, and they may be of any desired shape, such as the somewhat parallelogram or trapezoidal shape of FIG. 2, or bands as in FIG. 6, etc. Indeed, it is contemplated that in any of the forms of the invention, any areas of display could be provided. In fact, photographs could be reproduced on the display panel, with different areas thereof differently polarized. It has been found that a very interesting shimmering effect, such as of moving water, can be produced in a photograph including a lake or the like, whereby the water appears to move in a most realistic fashion.

The changing angles of polarized light and polarized display cause a certain amount of color to be introduced, and this color varies almost constantly. However, it further is contemplated that the different bands or areas of polarization on the display panel could be colored as well as polarized, and the different areas could be colored differently, or that certain areas could be colored the same.

As will be apparent, transparent dyes are used for such purpose. Rather than a tube, the polarization could be applied to a filter in the form of a belt that would pass between the light source and the display panel. Alternatively, a sheet of polarizing material could be moved back and forth as a filter between the light source and display panel.

As will be understood, the specific examples of the invention as herein shown and described are for illustrative purposes only. Various changes in structure will no doubt occur to those skilled in the art, and will be understood as forming a part of the present invention insofar as they fall within the spirit and scope of the appended claims.

The invention is claimed as follows:

1. A display device comprising a display panel having major and minor axes and having a plurality of differently polarized areas thereon, an elongated light source elongated in the direction of said major axis, an elongated tubular polarized filter encircling said light source and hence disposed between said light source and said display panel, said polarized filter comprising substantially a circular cylinder and having differently polarized areas thereon, and means for rotating said filter about said light source to vary the polarized light falling on said panel.

2. A display panel as set forth in claim 1 wherein the differently polarized areas comprise parallel bands extending the direction of said major axis.

3. A display device as set forth in claim 1 wherein said display panel comprises a reflecting panel, said light source and polarized filter being closer to some portions of said panel than others, the closer parts being relatively concave toward said light source and the more remote portion being relatively convex toward said light source.

4. A display device as set forth in claim 1 and further including a light shield interposed between said light source and said panel and having an elongated transparent area through which light passes from said light source to said panel.

References Cited
UNITED STATES PATENTS

| | | | |
|---|---|---|---|
| 2,146,962 | 2/1939 | Land | 240—9.5 X |
| 2,393,970 | 2/1946 | Burchell et al. | 240—9.5 X |
| 2,473,857 | 6/1949 | Burchell | 240—9.5 X |
| 3,124,639 | 3/1964 | Kahn | 240—9.5 X |
| 3,437,401 | 4/1969 | Siksai | 350—159 |

NORTON ANSHER, Primary Examiner

M. HARRIS, Assistant Examiner

U.S. Cl. X.R.

350—153, 159